United States Patent [19]

Mestais et al.

[11] Patent Number: 4,629,895
[45] Date of Patent: Dec. 16, 1986

[54] METHOD FOR PROCESSING THE PULSES SUPPLIED BY A GAMMA CAMERA AND A GAMMA CAMERA EMPLOYING THIS METHOD

[75] Inventors: Corinne Mestais, Massy; René Gauthier, Antony; Georges Roux, Limours, all of France

[73] Assignee: Informatek - Sopha Medical, Les Ulis, France

[21] Appl. No.: 612,146

[22] Filed: May 21, 1984

[30] Foreign Application Priority Data

May 27, 1983 [FR] France .................... 83 08824

[51] Int. Cl.⁴ .................................... G01T 1/164
[52] U.S. Cl. ........................... 250/369; 250/363 S
[58] Field of Search ............... 250/363 S, 369, 366

[56] References Cited

U.S. PATENT DOCUMENTS

| | | | |
|---|---|---|---|
| 3,914,611 | 10/1975 | Stout | 250/369 |
| 3,950,648 | 4/1976 | Martone et al. | 250/369 |
| 3,984,689 | 10/1976 | Arseneau | 250/369 |
| 4,051,373 | 9/1977 | Hatch | 250/363 S |
| 4,058,728 | 11/1977 | Nickles | 250/369 |

FOREIGN PATENT DOCUMENTS 2032726 5/1980 United Kingdom ............ 250/363 S

OTHER PUBLICATIONS

IEEE Trans. Nuclear Science, NS-17, Feb. 1970 (New York, U.S.) L. O. Johnson et al.: "A Direct-Coupled Gamma-Ray Spectrometer For . . . ", pp. 276-283.

Primary Examiner—Carolyn E. Fields
Attorney, Agent, or Firm—Roland Plottel

[57] ABSTRACT

In a gamma camera utilizing a collimator, a scintillator, a network of photomultiplier tubes and an array of matrices of resistors, the balanced pulses supplied by this array are measured by integration in an integrator stage which supplies locating pulses. These locating pulses serve the purpose of generating coordinate signals applied to a visual display device. Prior to integration, the direct interference components affecting the balanced pulses are eliminated by capacitive coupling of the array of matrices to the integrator stage. In order to prevent this coupling introducing means direct components at high counting rates, the output of this coupling means is periodically forced to assume the value of a base potential.

18 Claims, 6 Drawing Figures

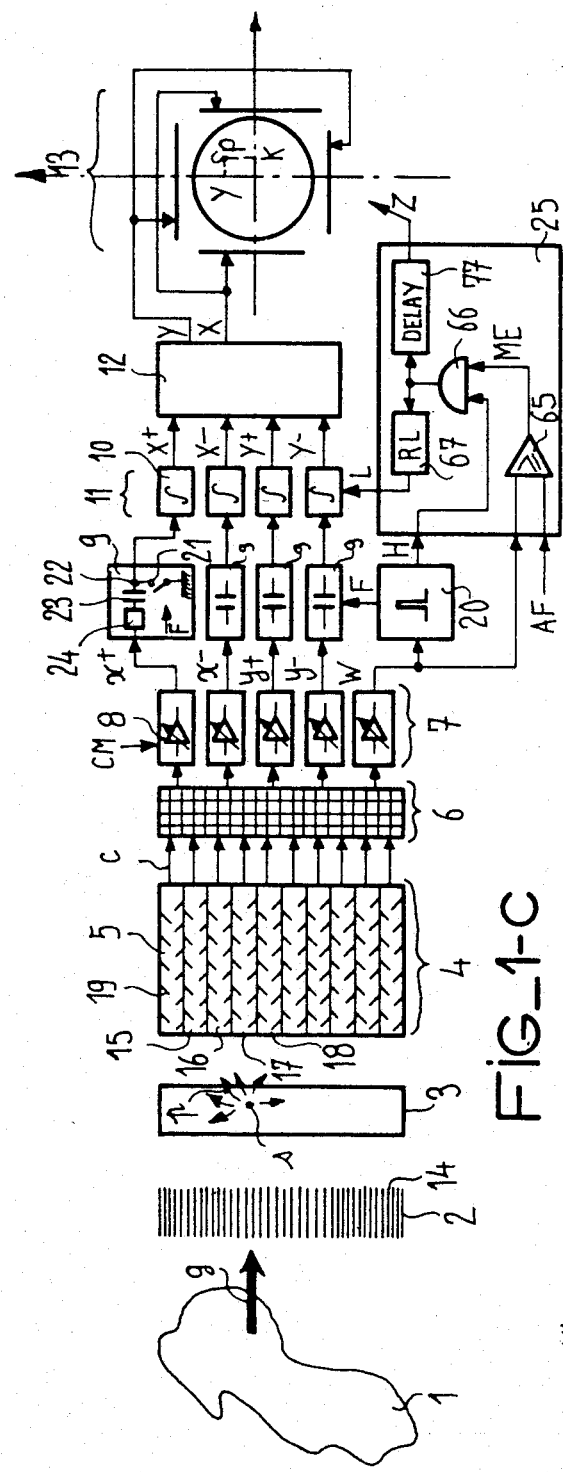
Fig_1-A
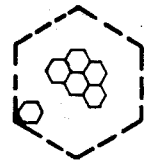
Fig_1-B
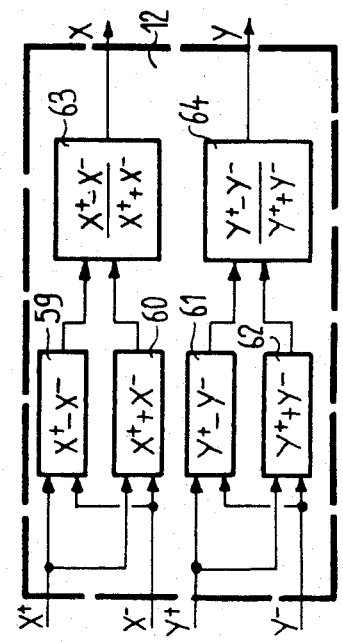
Fig_1-C

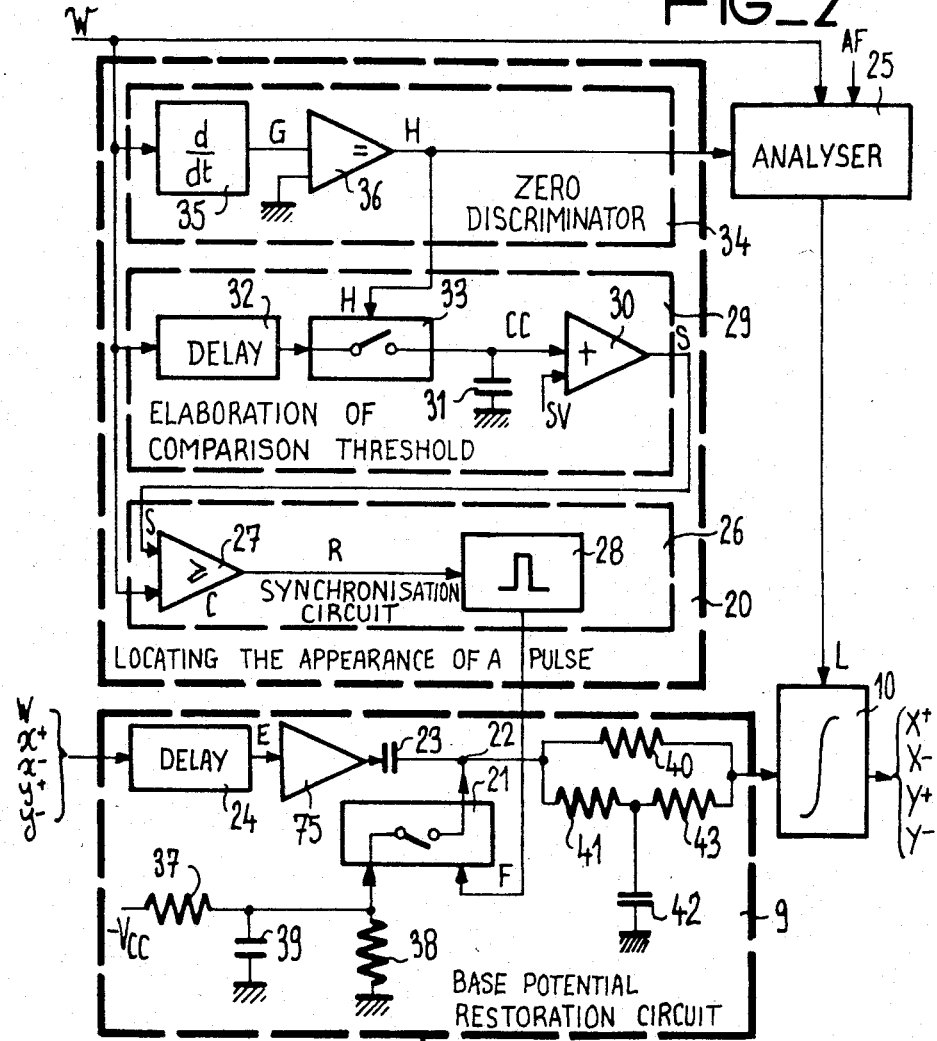
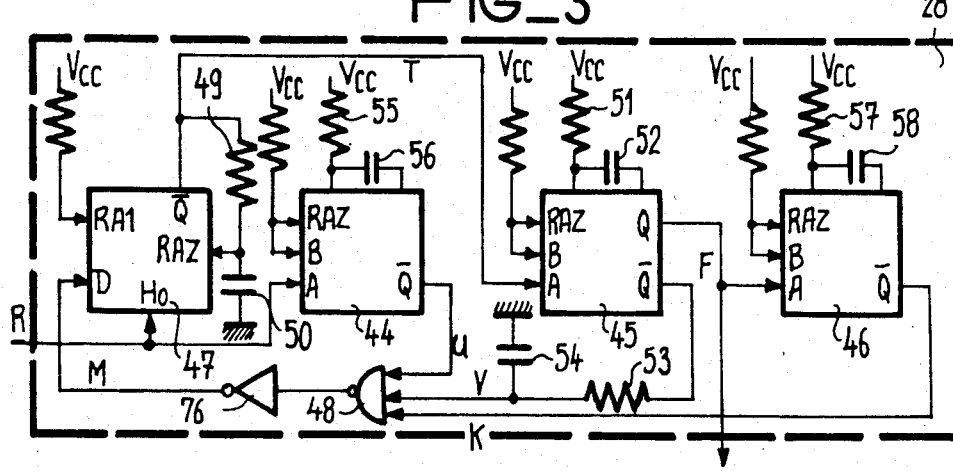

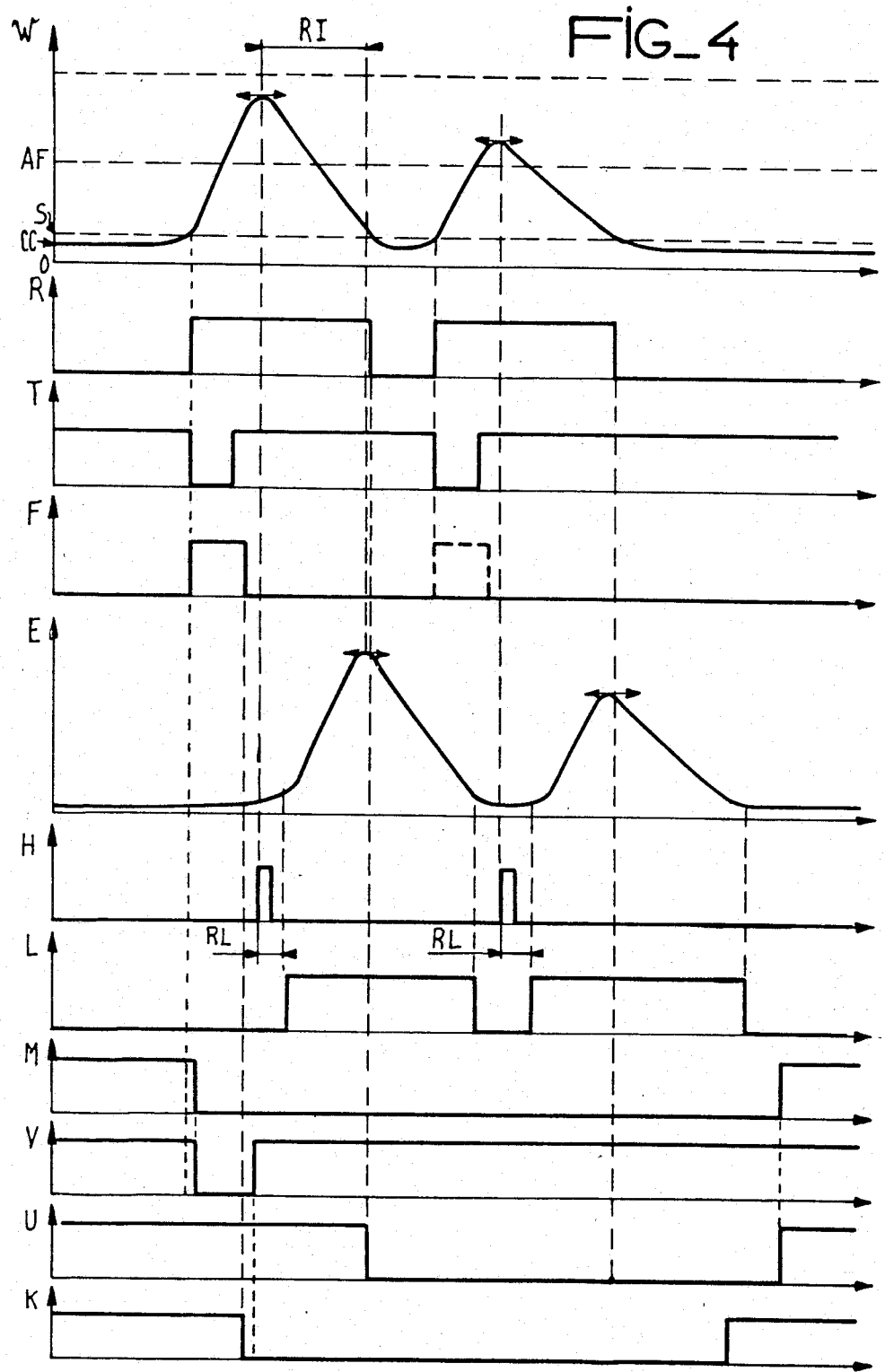

METHOD FOR PROCESSING THE PULSES SUPPLIED BY A GAMMA CAMERA AND A GAMMA CAMERA EMPLOYING THIS METHOD

BACKGROUND OF THE INVENTION

The invention relates to a method for processing pulses supplied by a gamma camera and to a gamma camera applying this method. It relates to scintillation or gamma cameras, of the ANGER type of which the fundamental operation and embodiments are disclosed in U.S. Pat. No. 3,011,057. These gamma cameras are intended for detection and visual display of the photons emitted by radioactive substances.

Gamma cameras are utilised in nuclear medicine to provide a visual display of the distribution within an organ of molecules tagged by a radioactive isotope which had been injected into a patient. A gamma camera commonly comprises a collimator for focussing the gamma photons emitted by the patient, a scintillator crystal for converting the gamma photons into luminous photons or scintillations, and a grid of photomultiplier tubes which each converts the scintillations into electrical pulses referred to as electrical tube contributions. It also comprises electronic circuits arranged to derive from the electrical contributions supplied by the photomultiplier tubes, signals giving the X and Y coordinates of the location at which the scintillation had occurred, as well as a validation signal Z when the energy W of the scintillation lies within a predetermined energy range.

This detection chain is followed by a visual display array, commonly comprising a cathode-ray oscilloscope controlled by the X,Y coordinates and the signal Z, for visually displaying the point of impact of the gamma photon on the crystal by means of a luminous dot on the screen. The visual display array may possibly comprise a photographic device so that an image of the organ observed may be produced in this manner by integrating a large number of luminous dots formed on the cathode-ray screen. It may moreover comprise a device for digital processing of the images.

Amongst other qualities a gamma camera should have is a satisfactory spatial resolution, that is to say the capacity to differentiate between closely spaced small radioactive sources, a satisfactory response regarding counting rate, that is to say the capacity to process a large number of events per unit of time, and an image quality unaffected by the energy of the isotope in question. The spatial resolution depends on the accuracy of calculation of the X and Y coordinates. The quality of calculation of these coordinates depends substantially on the physical laws governing the operation of the different parts of the gamma camera. Thus, the interaction between a gamma photon and the crystal gives rise to a luminous scintillation of which the intensity decreases exponentially with time. The time constant of this reduction is characteristic of the scintillator crystal utilised, being of the order of 250 nanoseconds for a thallium-activated sodium iodide crystal NaI(T1). This scintillation is detected simultaneously by several photomultiplier tubes. The luminous photons forming this scintillation release photoelectrons from the photocathodes of the photomultiplier tubes. The number of photoelectrons released in this manner fulfils POISSON's statistical law for a given scintillation. This means that the electrical contribution of a photomultiplier tube receiving a scintillation has an amplitude of a value which follows a POISSON statistical distribution and of which the mean value is a function of the energy of the incident luminous photons.

Since the scintillation is detected simultaneously by several photomultiplier tubes, the determination of the location of this scintillation on the crystal, which itself represents the seat of emission of the energising gamma photon, is obtained by calculating the position of the barycentre of the electrical contributions supplied by the assembly of photomultiplier tubes energised by this scintillation. According to ANGER, this calculation is performed in simple manner by injecting these contributions through a set of matrices of resistors. The values of these resistors are a function of the positions of the photomultiplier tubes to which they are connected. The positions of these tubes are located with respect to Cartesian reference axes of which the point of intersection is commonly situated at the centre of the network of tubes.

For a given scintillation, the most difficult problem to resolve consists in the determination with optimum precision of the mean value of the amplitudes of each of the contributions. It is known that these contributions may be integrated in time over a period of the order of the decay time constant of the scintillations of the scintillator crystal. The period of this integration is typically of the order of three times the time constant. The period of integration or counting is a direct derivation from the POISSON statistic. As a matter of fact, the typical variation of the fluctuation of the amplitude of the contributions according to POISSON's statistic is inversely proportional to the square root of the number of photo-electrons released. Consequently, the longer the integration, the greater will be the number of photoelectrons taken into account, and the smaller will be the typical variation, and the greater will be the precision with which the mean value of this contribution is determined.

As a matter of fact, the operation for calculating the location of the barycentre being a linear operation, it is more economical to perform this integration at the output of each of the matrices of resistors of the array of matrices. In effect, these matrices merely perform a weighting or balancing operation on these contributions as a function of the location of the tubes on the crystal. The electrical pulses supplied at the output of the array of matrices of resistors are referred to as weighted or balanced pulses. It will be noted in passing that the counting period is related directly to the quality of spatial resolution of the gamma camera, but that this quality is obtained at the expense of the counting rate, that is to say at the expense of the number of events per second taken into account.

This integrating operation cannot be performed without some difficulties. The principal difficulty consists in the presence of constant direct voltages which are superimposed over the balanced pulses supplied by the matrices and which upon being fed into integrators, falsify the value of the signal supplied by these in direct proportion with the length of the integration period. The origin of these direct voltages consists principally in the fact that variable gain amplifiers are interposed between each matrix of resistors and a corresponding integrator. These variable gain amplifiers are utilized for two reasons: firstly, they serve the purpose of selecting the energy range which is to be examined, and secondly, they perform a matching of the amplitude of the balanced pulses to the operational dynamics of the integrators utilized. It will be observed that these direct voltages which are to be eliminated may have different origins, in particular that resulting from an action referred to as a clutter of scintillations.

The electrical potential applied by these direct voltages alters what is commonly referred to as the base potential of the integrators. U.S. Pat. No. 3,984,689 of Roger E. Arsenaux, issued on 5th of Oct. 1976, disclosed that at high levels of radioactivity, that is to say at high counting rates which for example exceed 100,000 events per second, capacitive couplings which may have been considered first of all for elimination of these direct voltages, should be prescribed. In effect, the presence of such coupling capacities causes an alteration of the base potential linked essentially with the very rapid repeated appearance of the scintillations. These capacities result in an action restoring a D.C. component which depends on precisely the counting rate. Nevertheless, the levels of precision required at present in calculating the coordinate signals, impose the need for the erratic amplitude changes of these signals to remain smaller than a thousandth of their amplitude. Although the solution proposed in this U.S. Patent is the best in theory, it is inapplicable in practice because of the uncontrollable drift of the direct voltages of the various elements of the electronic chain, as the authors of the present invention were able to observe.

SUMMARY OF THE INVENTION

The present invention proposes that the disadvantages referred to above be resolved by the introduction of a capacitive coupling into this chain whilst restoring the base potential prior to the occurrence of a balanced pulse which is to be taken into account.

The invention provides a method for processing pulses supplied by a gamma camera, in which
scintillations generated under the action of a gamma radiation within a scintillator crystal are detected and amplified by means of a network of photomultiplier tubes,
and then weighted or balanced in matrices of resistors so as to generate the said pulses transmitted by capacitive couplings,
and of which the measurement is obtained by integration with respect to a base potential,
characterised in that this measurement is allowed to occur only after the end of a period in which there were no pulses, and in that the base potential is restored prior to another integration, during the end part of this said period.

The invention also provides a gamma camera provided with a device for processing of the pulses, comprising a collimator for collimating a gamma radiation which is to be measured on a scintillator crystal, a network of photomultiplier tubes for detection of the scintillations emitted by the scintillator and for amplifying the electrical contributions resulting from this detection, an array of matrices of resistors for balancing and summating the electrical contributions and thereby generating balanced pulses, and an integrator stage for measurement by capacitive coupling of the balanced pulses applied to the said integrators with respect to a base potential, characterised in that it comprises means for restoring the said base potential prior to each energy measurement, when the pulses are absent.

BRIEF DESCRIPTION OF THE DRAWINGS

A better understanding of the invention will be obtained from the following description and the drawings accompanying the same. This description is given by way of example and not as a limitation of the features of the invention. Identical symbols denote identical elements in the drawings, in which:

FIGS. 1A,1B and 1C illustrate a block diagram of a gamma camera equipped with a base potential restoration device in accordance with the invention, FIG. 2 illustrates the means of restoring the base potential in accordance with the invention, and the means of controlling these restoration means, FIG. 3 illustrates features of a circuit for synchronising the aforesaid restoring means, and FIG. 4 illustrates time diagrams of the signals occurring in the case of a gamma camera in accordance with the invention.

DETAILED DESCRIPTION OF THE INVENTION

FIG. 1A shows the block diagram of one embodiment of gamma camera according to the invention, in which the gamma rays g emitted by radioactive substance 1 are focussed via a collimator 2 on a scintillator 3. The gamma radiation g emitted produces a scintillation s whose luminous photons p act on the photocathodes of a network 4 of photomultiplier tubes 5. The electrical contributions c detected by the tubes 5 are fed to the input of an array 6 of matrices of resistors. The array 6 of matrices of resistors comprises five matrices in this embodiment which simultaneously and respectively supply weighted or balanced pulses denoted by $x+, x-, y+, y-$ and w. These balanced pulses are reshaped by means of a stage 7 of variable gain amplifiers 8. These balanced pulses are then each coupled capacitively by means of a base potential restoration circuit such as 9 to the corresponding integrator 10 of the integrator stage 11, except for the final pulse w. Locating pulses $X+, X-, Y+, Y-$ then supplied by the stage 11 are fed into a calculator circuit 12 which at its output supplies the X and Y coordinate signals intended to serve for a visual display of a luminous dot P on the screen of an oscilloscope 13. The position of the dot P with respect to the abscissa and ordinate axes appearing on this screen represents the location of the scintillation s on the scintillator 3 and consequently the point of emission of the gamma radiation g within the radioactive substance 1.

In one example, the collimator is a lead plate having a thickness of several centimeters, pierced by a plurality of holes 14 directed at right angles to its surface so that of the incident gamma radiation, only the photons propagated perpendicular to this surface are allowed to pass through. It is common knowledge that gamma photons of different energy are emitted by the radioactive substance 1 depending on its nature, for example gamma photons of energy values 80 Kev, 122 Kev and 360 Kev. In one example, the crystal 3 is based on thallium-activated sodium iodide as mentioned in the foregoing. The luminous photons p energise the photocathode of the photomultiplier tubes 15,16,17,18 which are situated opposite the location at which the scintillation s occurred. In a preferred form of the invention, the photomultiplier tubes such as 5 each have a hexagonal cross-section and are contiguously positioned with respect to each other to form a honeycomb network as is apparent from the cross-section of FIG. 1B. In one example, the surface area occupied by this network is of the order of 60×60 cms, the median of each of these tubes being of the order of 6 cms. The number of tubes of the network then amounts to 61. Each of the photomultiplier tubes 5 contains a set of dynodes such as 19 for amplification of the detections performed by these tubes. All the photomultiplier tubes of the network are adjusted in such a manner that they feed an identical contribution c into the array of matrices 6 upon receiving the same light energy on their photocathodes.

The array of matrices 6 comprises five matrices, each having an identical number of resistors. Each resistor of a matrix is connected on the one hand to the output of a photomultiplier tube, and on the other hand to a common terminal forming the output of the matrix. In the example given, each of the matrices comprises 61 resistors. The matrices supplying the signals $x+,x-,y+,y-$ comprise resistors whose values are a function of the position of the tube. Two Cartesian reference axes are set up on the crystal. The resistors of the matrix supplying the balanced pulse $x+$ then undergo an incremental progression as a function of the abscissa of the tube in question. The resistors of the matrix supplying the balanced pulse $x-$ undergo an identical but decremental progression. The same applies for the matrices supplying the balanced pulses $y+$ and $y-$ in which the progression is incremental or decremental respectively as a function of the ordinate of the photomultiplier tube in question. All the resistors are practically equivalent in the fifth matrix supplying the balanced pulse w representing the energy of the scintillation. They may be preset at the manufacturers plant from one photomultiplier to another, notwithstanding its position on the crystal. After integration in the integrators of the integrator stage 11, the balanced pulses are converted into locating pulses $X+,X-,Y+$ and $Y-$. The electrical X and Y coordinate signals are then proportional, respectively, to the values $((X+)-(X-))$ and $((Y+)-(Y-))$.

Each of the base potential restoration circuits 9 interposed between the set 6 of matrices and the stage 11 (the array 7 of variable gain amplifiers 8 will be disregarded in the remainder of this statement) operates in the manner which will now be examined. When a balanced pulse corresponding to a scintillation appears, in particular on the channel of energy w, it is taken into account by a circuit 20 for location of the appearance of the pulse. Right from the start of this balanced pulse, the circuit 20 transmits an order F fed to a relay 21 of the circuit 9. The relay 21 is a rapid analog gate of a known kind. Throughout the period of presence of the order F, which is referred to as the restoration period, the relay 21 is closed and restores a base potential on the terminal 22 of the capacitance 23 which is connected to the integrator 10. This base potential restoration is denoted in this case by an earthing connection. Since the balanced pulse $x+$ is fed into the circuit 9 via a delay line 24, the transmission of the pulse $x+$ is not affected by this enforced potential. When the order F stops, the relay 21 opens and in view of the time constants imposed by the input impedance of the integrator 10 in conjunction with the capacitor 23, the potential of the terminal 22 remains at the enforced value. The pulse which had been delayed in the line 24 by a period RI then reaches the capacitance 23 which it traverses so that it may be applied to the input of the integrator 10. The delay period of the delay line 24 is obviously greater than or equal to the period of the restoration order F. In these circumstances, the measurement by integration of the balanced pulses in the stage 11 occurs without contribution from constant direct voltages which have been eliminated in this manner.

Another procedure consists in placing in the path of the balanced pulses a set of analog gates operated periodically to allow these pulses to pass, if present, only at known cyclically repeated periods. An oscillator circuit, which is not illustrated but which may easily be envisaged, may then alternately supply an order for blocking of these analog gates and an order F for restoration of base line potential. In this second method, the presence of the delay line 24 in the circuit 9 is optional. It is apparent from these two procedures that the base potential is restored during the absence of a pulse, in the case of the invention. In the first case, the absence of the pulse is established by means of a circuit such as 20 (since it is precisely the onset of its appearance which is detected to trigger the process of restoring the base potential), in the second case, the absence of the pulse is induced.

The circuit for determining the appearance of the pulse is connected to an amplitude analyser 25. This analyser 25 has the task of measuring the magnitude of the balanced pulse having the energy w and of supplying the stage 11 with a logic order L to initiate integration only if the amplitude of this pulse corresponds to that selected by means of a display instruction AF. This analyser 25 essentially comprises a group of comparators checking that the balanced pulse maximum w lies between the two extreme values of the display range AF. The display instruction AF depends on the manual control of the gain CM of the variable gain amplifiers 8. If the balanced pulse for which the base line potential has been restored lies within the range displayed, the order L validates the operation of the integrators of the stage 11. At the end of a preselected integration period, these integrators then supply the locating pulses $X+,X-,Y+$ and $Y-$. Furthermore, the analyser 25 supplies an order Z for validation of the coordinates, which is equally applied to the visual display device, in particular to the Wehnelt control of the oscilloscope 13.

The circuit 12 for calculation of the X and Y coordinate signals is illustrated in FIG. 1C. It comprises a set of summators 59 to 62 supplied via their inputs with the locating pulses $X+$ and $X-$ or $Y+$ and $Y-$ and intended to perform the following operations, respectively: $X+ -X-$ and $X+ +X-$ or $Y+ -Y-$ and $Y+ +Y-$. The second input of the summators 59 and 61 comprises an inverter, not shown, to perform subtractions instead of additions. The standardisation of X and Y is secured by connection, respectively, of the outputs of the summators 59 and 60 or 61 and 62 respectively to the two inputs of two dividers 63 and 64. In an example, these dividers are rapid analog dividers 429B of Analog Devices. A patent application Ser. No. 612,367 filed by the applicants on the same day as this application describes this calculator circuit 12 which performs the standardisation of the coordinate signals to free them of the energy of the signal received without receiving the signal W.

FIG. 2 shows one embodiment of a base potential restoration circuit 9 and of a circuit 20 for location of the appearance of the pulse in accordance with the invention. These circuits are connected, as previously, to the amplitude analyser 25 and to an integrator 10. The base potential restoration circuits 9 are identical notwithstanding which balanced pulse $x+,x-,y+$ and y— is to be taken into account, being incorporated in quadruplicate in this embodiment of the invention. In particular, each of these comprises a delay line 24 in series with a connecting capacitance 23 whose terminal 22 is placed at the base potential during application of a restoration order F to a relay 21. The reasons for the presence of the different RC circuits in the circuit 9 are connected with the need to correct the base potential to be taken into account: this is consequently not necessarily that of earth, as recalled earlier. These corrections have the consequence however that they improve the result of restoration which would already have been adequate with a direct earthing connection. The presence of the amplifier 75 between the capacitance 23 and the delay line 24 has the object of establishing the impedance matching of the output of the delay line 24 and consequently of preventing the reflection of the balanced pulses off an unmatched impedance. The secondary action of this amplifier is to alter the sign of the balanced pulses, which is of little importance.

This circuit 20 for establishing the appearance of the pulse essentially comprises a synchronising circuit 26 in which a comparator 27, receiving the signal w and a comparison threshold S on its terminals, is caused to change state and supply an order R when the signal W rises above S. The threshold S is set at the lowest possible level, in such a manner as to determine the instant of the onset of the pulse w with optimum precision. When the switching action of the comparator 27 occurs, the signal R is fed to the input of a circuit 28 for generating the instruction F. This generator circuit 28, as described more particularly in the following, essentially comprises a set of monostable flipflops for imposing a definite restoration period on the instruction F.

The solution consisting is adopting a constant threshold S is not always the best one, especially since the signal w is handicapped by a direct component whose value drifts in random manner in time. Consequently, in order to prevent accidental generation of the instruction F, it becomes necessary to set the threshold S at a higher value then the maximum value attainable by this direct component. This then has the result that the instruction F is not always triggered precisely at the instant of appearance of the balanced pulse w, but instead a little later, when it has reached the specified threshold S. In a preferred embodiment of the invention, the comparison threshold S is obtained in a circuit 29 for generating this threshold, in which the true threshold SV which is to be taken into account, is added to the direct interference component CC of w in a summator 30. The measurement of this direct component CC is obtained by measuring the value of the signal w before the appearance of the pulse. To this end, a capacitance 31 connected in parallel with the input of the summator 30 is charged to the value of the direct component CC, between the periods in which the balanced pulse w occurs. Consequently, the signal S is then the sum of the signal SV and of the signal CC, and the interference of this direct component CC will be neutralised during the comparison in the comparator 27 of this signal S with the pulse w. In these circumstances the true threshold SV may be set at as low a value as required.

In order to measure the direct component CC the value of w is taken into account before the instant of appearance of the pulse. This consideration is established merely by interposing between the signal w and the corresponding input of the summator 30 a specific delay line 32 in series with a triggering relay 33. This triggering relay also comprises a rapid analog gate. The triggering relay 33 is closed and consequently assures transmission of w to the summator 30, when a zero discriminator circuit 34, measuring the instant of passage of the peak of the pulse, transmits a triggering instruction H indicating the presence of the pulse. Since w is transmitted via the delay line 32, the output of the delay line 32 will at this time supply a level representing the direct component of the pulse w before the latter occurs. Considering that the maximum of the balanced pulse w occurs at the end of a substantially constant period following the onset of this pulse, it is sufficient merely to adjust the delay of the specific delay line 32 so that it exceeds this period.

The measurement of the instant of passage of the maximum of the balance pulse w by the zero discriminator 34 occurs in simple manner by feeding this pulse w through a differentiator or transducer 35 supplying a signal G staggered with respect to the time of the pulse w. When this staggered signal cancels out, this means that the pulse is at its maximum. Consequently, a triggering signal H utilized to actuate the relay 33 is obtained during the change of state of the comparator 36 by comparing the value of this signal to a zero value in this comparator. In practice, the comparator 36 comprises a monostable flipflop at the output and the signal H is the pulsed signal whose duration is adequate to permit charging the capacitor 31 via the output of the delay line 32. It will be noted that it would have been possible to replace the zero discriminator 34 by a circuit analogous to the circuit 26 by commensurate modification of the delay provided by the specific delay line 32. What is actually of importance in this case, as in the preceding one, is to feed w to the input of the comparator 30 when it represents no more than the direct component CC which is to be eliminated.

On the contrary, the triggering signal H also has another function. In effect, upon being supplied to a second input of the amplitude analyser 25, it may enable this analyser 25, for a given energy range (the highest energy range) to comprise no more than a comparator measuring the rise of the pulse w beyond the lower value of the range in question. When this run-past signal is immediately followed by the appearance of the signal H, this means that the pulse had peaked within the range and consequently that the amplitude analyser 25 may generate the logic integration actuation order L. To this end, the analyser 25 (FIG. 1A) comprises a comparator 65 receiving the balanced pulse w and the display instruction AF on the input. When w rises above AF, the comparator switches over and transmits an order ME to the input of an AND gate 66. When the signal H is fed to the other input of 66, the AND gate 66 switches over and transmits a logic integration control order L for application to the integrator of the stage 11. This order L is not actually transmitted until after traversing a delay circuit 67 to assure satisfactory synchronisation. In the same way, the validation order Z is obtained by connecting the output of 66 to the input of a delay circuit 77 assuring satisfactory synchronisation of the integration and subsequent visual display of the result of this integration. The analyser 25 may comprise complementary circuits to make allowance for the different energy ranges of the scintillation. For lower or intermediate ranges, another comparator (not shown) measuring the rise of the pulse w above the upper value of the range, invalidates the generation of the order L upon detecting that w had peaked outside this range.

The technological characteristics of the rapid analog gates 21 (such as National Semiconductor AH0015CD or Siliconics DG181BA), in particular their response time, their conduction resistance "Ron" greater than zero, and the transfers of internal charges between an actuation and a signal to be transmitted, have the result that the restoration of the base potential is performed at a level differing from zero by very little. This level appears in the form of another direct component depending on the counting rate. The elimination of this new direct component is secured by exposing the upstream terminal of the relay 21 to a potential equal to and of opposite sign to that of this new direct component. This potential is imposed quite simply by means of a resistive divider bridge comprising the resistors 37 and 38 energised between a potential $-$Vcc and earth. In an application in which the value of the pulses w is of the order of 4 volts, Vcc is of the same order, and the ratio between the resistors 37 and 38 is calculated to impose a negative potential of a few millivolts on the upstream terminal of the relay 21. The capacitance 39 connected in parallel to the resistor 38 acts to minimise the demand for current occurring upon closure of the relay 21. However, the counting rate of a gamma camera is not constant. It depends on the radioactivity of the isotope utilized. This radioactivity fluctuates about a nominal value, thereby causing the counting rate to change. The circuit 37–39 is set to the nominal value. To make allowance for this fluctuation, the balanced pulse added to a correction signal taking account this fluctuation of the counting rate, is fed into the integrator 10. The balanced pulse is fed into the integrator 10 via the resistor 40, whereas the correction signal available at the centre point of a dipole formed by the resistor 41 and the capacitor 42 is fed into the integrator via the resistor 43. Apart from the weightings performed by the resistors 40 and 43 respectively on each of these signals, it is certainly observed that it is their sum which is fed to the integrator 10. This correction signal is obtained quite simply by integrating the stabilised pulse in the low-pass circuit formed by the resistor 41 and the capacitor 42. The charge of this latter is thus a function of the counting rate. The values of the passive components numbered 37 to 42 are adjusted by experimentation.

The circuit 28 generating the synchronising instruction F will now be examined with reference to FIG. 3 and to the time diagrams of FIG. 4. This circuit receives the signal R coming from the comparator 27 of the synchronising circuit 26. In essence, it comprises three monostable flipflops operating in asynchronous mode, namely the flipflops 44,45,46 and it equally comprises a D type flipflop, being the flipflop 47. The order F is delivered at the output Q of the flipflop 45. The D flipflop 47 essentially serves the purpose of assuring the operation of the monostable flipflops 44 to 46. As a matter of fact, if the signal R has too short a period, the operation of these latter is not ideal. In one example, these flipflops 44 to 46 are TEXAS INSTRUMENTS types 74123,74221 and 74221 respectively, which for their energization require a pulse of a minimum period of the order of some fifty nanoseconds. The D flipflop 47 is of the TEXAS INSTRUMENTS type 7474.

The connections of the circuit 28 are the following: the flipflop 44 has its input A connected to the output of the comparator 27; the output $\overline{Q}$ of the flipflop 44 is connected to a first input of a NAND gate 48 having three inputs; the output $\overline{Q}$ of the flipflop 47 is connected to the input A of the flipflop 45; the output $\overline{Q}$ of the flipflop 45 is connected via a low-pass circuit 53,54 to the second input of the gate 48; the output Q of the flipflop 45 is connected on the one hand to the input A of the flipflop 46 and on the other hand to each of the control inputs of the relays 21 of the circuits 9; the output $\overline{Q}$ of the flipflop 46 is connected to the third input of the gate 48; the output of the gate 48 is connected to the input D of the flipflop 47 via an inverter 76; the centre point of the RC circuit 49–50 is connected to the input RAZ of the flipflop 47; the input RA1 of the flipflop 47 is connected to the supply voltage Vcc. The other connections for polarization and installation in monostable mode of the flipflops 44 to 46 are not described since they are trivial.

The satisfactory operation of the device for restoration of the base potential requires application of the instruction F at an instant unoccupied by any balanced pulse, meaning at an instant in which allowance is made only for the direct voltages of the detection chain. If the command for charging the connecting capacitor 23 occurs at an instant when the signal is present, the capacitor acquires a mean charge differing from the mean value of the direct voltages and the amplitude of the next pulse is fasified. This leads to erroneous calculation of coordinates and a deterioration of the spatial resolution. Consequently, a first precaution consists in preventing repeat triggering of the signal F by interference signals following the balanced pulse of energy w. A second precaution consists in making certain that, prior to triggering, w had remained smaller than the very low threshold SV sufficiently long to avoid charging the connecting capacitor 23 with the tail end of a preceding pulse, for example in the case of "crowding".

These two precautions are provided by means of an invalidation order M fed to the input D of the D flipflop 47 for as long as the interference reflections of the balanced pulses energize the monostable flipflop 44 or during a particular period of sufficient length imposed by the monostable flipflip 46. Thus, when a balanced pulse had been taken into account and had elicited an order F, the monostable flipflop 46 imposes an invalidation order for a period of sufficient length, this period amounting to 2300 nanoseconds in an example. This period is equal to that which would result from clutter caused by a sequence of some ten balanced pulses. This situation is accepted as being highly unlikely, and it is consequently completely justified to cause said invalidation to stop at the end of this period. Furthermore, if reflections of the balanced pulses occur repetitively, the monostable flipflop 44 continues to generate the invalidation order M for as long as these reflections persist. As a matter of fact, this flipflop 44 is of a retriggerable type, meaning that the negative pulse it supplies, instead of rising again at the end of a predetermined period, of 1800 nanoseconds in this case, after the first energization, is organized to rise again only after this same period following the final energization received. For simplification in the example, it may be considered that if reflections occur during 600 nanoseconds, the invalidation order caused by the monostable flipflop 44 will last for 1800 nanoseconds $+$600 nanoseconds $=$2400 nanoseconds, whereas it would have lasted no more than 2300 nanoseconds if caused by the monostable flipflop 46.

The operation of the circuit 28 will now be described in detail. FIG. 4 shows a signal w peaking twice within a particular energy range. The signal R obtained at the output of the comparator 27 has two positive pulses whose position is determined by the instants of passage of the signal w through the value S of the comparison threshold. The signal E is the signal w obtained at the output of the delay line 24, consequently being delayed with respect to the latter by a period RI. The base potential restoration order F is triggered by the rising flank of the signal R and has a shorter duration than the delay undergone by the signal E.

The signal H supplied by the zero discriminator 34 is triggered at the instant of passage of the maximum of the balanced pulse w. The generation of the signal F is actuated by the appearance of the signal R but it could be obtained by appearance of the signal H, in which case it would be appropriate to make provision for commensurate modification of the delay established by the delay line 24, if the logic circuit 28 is retained unchanged. In these conditions, the delay line 24 would have a longer delay period and the increase in duration would be of the order of the period of the balanced semipulse. The signal H acts on the amplitude analyser 25 which then delivers the logic signal L for operation of integration of the integrators of stage 11 with a logic delay RL. It will be observed that this integration is started in practice before the application of the balanced pulses to the integrators 10 and that it is ended practically right after the same. The second pulse of the signal F appears as dashed because it is actually invalidated in the logic circuit 28 in the following manner.

Prior to application of the first pulse R, the circuit 28 is in the following state: the signal T at the output $\bar{Q}$ of the flipflop 47 is in the state 1, the signal U at the output $\bar{Q}$ of the flipflop 44 is in the state 1, as are the signals V and K respectively at the output $\bar{Q}$ of the flipflops 45 and 46. Consequently, the output signal of the NAND gate 48 is in the zero state, and the signal M at the output of the inverter 76 is in the state 1. Upon applying the rising flank of the signal R to the clock input Ho of the flipflop 47, the signal T drops to zero again for a period depending on the time constant of the RC circuit 49 and 50 respectively. When the centre of this RC circuit reaches zero, it triggers the zero reset RAZ of the flipflop 47 whose output $\bar{Q}$ is restored to the state 1. In one example, the period of the negative pulse T is of the order of 220 nanoseconds. Immediately upon being generated, this pulse T is fed to the input A of the flipflop 45. Its dropping flank triggers the switching of the outputs Q and $\bar{Q}$ of this flipflop. The output Q then changes from the state zero to the state 1 for a period depending on the time constant of the RC circuit 51 and 52. The order F is generated in this manner during this period. In one example, this period is of the order of 440 nanoseconds and the delay RI imposed by the line 24 is of the order of 680 nanoseconds. During the same time, the output $\bar{Q}$ of the flipflop 45 changes into the zero state and the signal V consequently changes to the zero state but a little later because of the presence of the delaying circuit 53,54 respectively. This signal V has the same duration as the signal F. Immediately upon application of the dropping flank of the signal R to the input A of the flipflop 44, the output terminal $\bar{Q}$ of this flipflop changes from the state 1 to the zero state, the signal U which causes the signal M to change, consequently imposing a zero state on the input D of the flipflop 47. Consequently, during the next pulse of the signal R, the signal T firstly does not change its state since it continues to be imposed in the state 1, and secondly, the signal U remains at zero but for a period initialized on the arrival of this second pulse of the signal R. Consequently, the signal F is not generated again between the two balanced pulses w since they are chronologically too close to each other. If this effect had not come into action, it is the trailing flank of F applied to the input A of the flipflop 46 which would have caused the change to zero of the signal K available at the output $\bar{Q}$ of this flipflop. The input D of the flipflop 47 would then have been invalidated by this signal K for a period of 2300 in said example, by causing the signal M to switch to zero.

If no other pulse is received from the comparator 27 and if R therefore constantly remains at zero, once the time constants of the flipflops 44 to 46 have elapsed, these cause the signals U, V and k to return to 1 and consequently the signal M to return to 1. In this condition, the circuit 28 is available again to enable generating an order F on arrival of the leading rising flank of the next signal R. The periods of the pulses U and K supplied by the flipflops 44 and 46 are determined, respectively, by the RC circuits 55,56 and 57,58 connected to the terminals of these flipflops. In a known manner, these circuits are connected to the DC voltage VCC supplying the circuit. The same applies regarding the reset to 1 input RA1 and the reset to zero input RAZ, respectively, of the flipflops 47,44,45 and 46. The reason for the delay inserted in the RC circuit 53,54 is related to the need to assure a satisfactory overlap of the pulses U and K at the input of the NAND circuit 48.

A spatial resolution of less than 0.4 centimetres measured in the plane of the scintillator is obtained for counting rates exceeding 200,000 events per second, with a gamma camera comprising the base line restoring device described.

We claim:

1. A gamma camera provided with a pulse processing device comprising collimator means for collimation of a gamma radiation which is to be measured on a scintillator crystal, network means including a network of photomultipler tubes for detection of the scintillations emitted by the scintillator and for amplifcation of the electrical contributions resulting from this detection, array means including an array of matrices of resistors for balancing and summating the electrical contributions and for the generation of balanced pulses, stage means including integrators for measuring with respect to a base potential the balanced pulses applied to said integrators by capacitive coupling, means for restoring the said base potential prior to each measurement, in the absence of the pulses, the means for restoring comprises a set of networks each formed by a delay line and by a capacitor arranged in series with the dealy line, these networks being inserted in each case between a resistor matrix and a corresponding integrator, the terminal of the capacitor connected to the integrator being placed at the base potential under the action of a synchronising relay, controlled by means for locating the appearance of the pulses and the period of delay imposed by the said delay line being substantially greater than or equal to the period of restoration of this base potential, the means for locating the appearance of the pulses comprise, within a synchronising circuit, a comparator supplied at its inputs with balanced pulses and a comparison threshold and delivering a logic signal for actuation of the synchronising relay when the balanced pulses exceed this comparison threshold, and means for assuring that the comparison threshold is the sum of a true comparison threshold and of a direct interference component affecting the balanced pulses which are fed to the comparator of the synchronising circuit.

2. A gamma camera according to claim 1, wherein the means for locating the appearance of the pulses comprise zero discriminator circuit means for receiving balanced pulses and supplying a triggering signal when a balanced pulse is at its maximum and for actuation at this instant of a circuit for generation of the comparison threshold, comprising a triggering relay interposed between a specific delay line receiving the balanced pulses and one of the inputs of a summator which moreover receives a direct voltage representing the true threshold which is to be taken into account, and whose output supplies the comparison threshold fed into the synchronising circuit.

3. A gamma camera according to claim 2, wherein the delay imposed by the specific delay line is substantially greater than half the period of the pulses which are to be measured.

4. A gamma camera according to claim 3 wherein the zero discriminator circuit means comprises differentiator means for supplying a signal representing the deviation of the variations of the pulse with respect to time and is connected to a threshold comparator for generating the triggering signal when the deviation signal is zero.

5. A gamma camera according to claim 3, in which the array of matrices of resistors simultaneously supplies four balanced pulses for locating the position on the scintillator of the scintillation emitted, and a balanced pulse representing the energy of this scintillation, characterized in that this energy pulse is that which is fed into means for locating the appearance of the pulses.

6. A gamma camera according to claim 2, characterised in that the zero discriminator circuit means comprises differentiator means for supplying a signal representing the deviation of the variations of the pulse with respect to time and is connected to a threshold comparator for generating the triggering signal when the deviation signal is zero.

7. A gamma camera according to claim 2, in which the array of matrices of resistors simultaneously supplies four balanced pulses for locating the position on the scintillator of the scintillation emitted, and a balanced pulse representing the energy of this scintillation, characterized in that this energy pulse is that which is fed into means for locating the appearance of the pulses.

8. A gamma camera according to claim 1, wherein it comprises means for adjusting the base potential as a function of the counting rate of the gamma camera.

9. A gamma camera according to claim 8, wherein it comprises means of adjusting the base potential as a function of the variations of the counting rate of the gamma camera.

10. A gamma camera according to claim 8, further comprising means for temporary prevention of another measurement of the pulses in the integrator stage after each measurement performed.

11. A gamma camera according to claim 1, in which the array of matrices of resistors simultaneously supplies four balanced pulses for locating the position on the scintillator of the scintillation emitted, and a balanced pulse representing the energy of this scintillation, characterised in that this energy pulse is that which is fed into means for locating the appearance of the pulses.

12. A gamma camera according to claim 1 further comprising means for temporary prevention of another measurement of the pulses in the integrator stage after each measurement performed.

13. A gamma camera according to claim 12, characterised in that it comprises means of adjusting the period of prevention of the next measurement of the pulses as a function of the activity of the scintillator.

14. A gamma camera provided with a pulse processing device comprising collimator means for collimation of a gamma radiation which is to be measured on a scintillator crystal, network means including a network of photomultiplier tubes for detection of the scintillation emitted by the scintillator and for amplification of the electrical contributions resulting from this detection, array means including an array of matrices of resistors for balancing and summating the electrical contributions and for the generation of balanced pulses, stage means including integrators for measuring with respect to a base potential the balanced pulses applied to said integrators by capacitive coupling, means for restoring the said base potential prior to each measurement, in the absence of the pulses, the means for restoring comprises a set of networks each formed by a delay line and by a capacitor arranged in series with the delay line, these networks being inserted in each case between a resistor matrix and a corresponding integrator, the terminal of the capacitor connected to the integrator being placed at the base potential under the action of a synchronising relay, controlled by means for locating the appearance of the pulses and the period of delay imposed by the said dealy line being substantially greater than or equal to the period of restoration of this base potential, and means for adjusting the base potential as a function of the counting rate of the gamma camera.

15. A gamma camera according to claim 14, further comprising means for adjusting the base potential as a function of the variations of the counting rate of the gamma camera.

16. A gamma camera provided with a pulse processing device comprising collimator means for collimation of a gamma radiation which is to be measured on a scintillator crystal, network means including a network of photomultiplier tubes for detection of the scintillations emitted by the scintillator and for amplification of the electrical contributions resulting from this detection, array means including an array of matrices of resistors for balancing and summating the electrical contributions and for the generation of balanced pulses, stage means including integrators for measuring with respect to a base potential the balanced pulses applied to said integrators by capacitive coupling, means for restoring the said base potential prior to each measurement, in the absence of the pulses, the means for restoring comprises a set of networks each formed by a delay line and by a capacitor arranged in series with the delay line, these networks being inserted in each case between a resistor matrix and a corresponding integrator, the terminal of the capacitor connected to the integrator being placed at the base potential under the action of a synchronising relay, controlled by means for locating the appearance of the pulses and the period of delay imposed by the said delay line being substantially greater than or equal to the period of restoration of this base potential, and means for temporary prevention of another measurement of the pulses in the integrator stage after each measurement performed.

17. A gamma camera according to claim 16, comprising means for adjusting the period of the prevention of the next measurement of the pulses as a function of the activity of the scintillator.

18. A gamma camera provided with a pulse processing device comprising collimator means for collimation of a gamma radiation which is to be measured on a scintillator crystal; network means including a network of photomultiplier tubes for detection of the scintillations emitted by the scintillator and for amplification of the electrical contributions resulting from this detection; array means including an array of matrices of resistors for balancing and summating the electrical contributions and for the generation of balanced pulses, stage means including integrators for measuring with respect to a base potential the balanced pulses applied to said integrators by capacitive coupling; means for restoring the said base potential prior to each measurement, in the absence of the pulses, the means for restoring comprises a set of networks each formed by a delay line and by a capacitor arranged in series with the delay line, these networks being inserted in each case between a resistor matrix and a corresponding integrator, the terminal of the capacitor connected to the integrator being placed at the base potential under the action of a synchronising relay, controlled by means for locating the appearance of the pulses and the period of delay imposed by the said delay line being substantially greater than or equal to the period of restoration of this base potential, the means for locating the appearance of the pulses comprise, within a synchronising circuit, a comparator supplied at its inputs with balanced pulses and a comparison threshold and delivering a logic signal for actuation of the synchronising relay when the balanced pulses exceed this comparison threshold, and means for assuring that the comparison threshold is the sum of a true comparison threshold and of a direct interference component affecting the balanced pulses which are fed to the comparator of the synchronising circuit, and means for adjusting the base potential as a function of the counting rate of the gamma camera, and means for temporary prevention of another measurement of the pulses in the integrator stage after each measurement performed.

* * * * *